United States Patent
Van Tichelen et al.

(10) Patent No.: US 6,311,159 B1
(45) Date of Patent: Oct. 30, 2001

(54) SPEECH CONTROLLED COMPUTER USER INTERFACE

(75) Inventors: Luc Van Tichelen, Waregem; Guido Gallopyn, Zottegem, both of (BE)

(73) Assignee: Lernout & Hauspie Speech Products N.V., Ypres (BE)

( * ) Notice: Subject to any disclaimer, the term of this patent is extended or adjusted under 35 U.S.C. 154(b) by 0 days.

(21) Appl. No.: 09/412,251

(22) Filed: Oct. 5, 1999

Related U.S. Application Data

(60) Provisional application No. 60/103,059, filed on Oct. 5, 1998.

(51) Int. Cl.[7] .............................. G10L 11/00; G10L 15/06; G10L 13/08
(52) U.S. Cl. ...................... 704/275; 704/260; 704/257; 704/251
(58) Field of Search .................................. 704/260, 275, 704/257, 251

(56) References Cited

U.S. PATENT DOCUMENTS

| | | | |
|---|---|---|---|
| 5,317,688 | | 5/1994 | Watson et al. ......................... 395/161 |
| 5,586,218 | | 12/1996 | Allen ....................................... 395/10 |
| 5,802,253 | | 9/1998 | Gross et al. ............................ 395/51 |
| 5,805,775 | * | 9/1998 | Eberman et al. ..................... 704/257 |
| 5,809,269 | * | 9/1998 | Favot et al. .......................... 704/260 |
| 5,809,492 | | 9/1998 | Murray et al. ......................... 706/45 |
| 5,819,243 | * | 10/1998 | Rich et al. .............................. 706/11 |
| 5,890,123 | * | 3/1999 | Brown et al. ......................... 704/275 |
| 6,003,005 | * | 12/1999 | Hirschberg ........................... 704/260 |

FOREIGN PATENT DOCUMENTS 0 592 280   4/1994   (EP).

OTHER PUBLICATIONS

D. Chauhan, A. Baker, "Developing Coherent Multi–Agent Systems using JAFMAS," International Conference on Multi–Agent Systems, Jul. 1998.*

S. Sutton, D. Novick, R. Cole, P. Vermeulen, J. deVilliers, J. Schalkwyk & M. Fanty, "Building 10,000 Spoken Dialogue Systems," 4th International Conference on Spoken Language, Oct. 1996.*

Emelyanov, G, M., et al, "Semantic Analysis in Computer–Aided Systems of Speech Understanding", *Pattern Recognition and Image Analysis: New Information Technologies*), vol. 8, No. 3, Dec. 1997, pp. 408–410.

Garner, et al, "A Theory of Word Frequencies and Its Application to Dialogue Move Recognition", *Proceedings in the 1996 International Conference of Spoken Language Procecessing*, vol. 3, Oct. 1996, pp. 1880–1883.

Valverde–Albacete, et al, "a Multi–Level Lexical–semantics Based Language Model Design for Guided Integrated Continuous Speech Recgonition", *Proceedings of the 1996 International Confernece on Spoken Language Proceedings*, vol. 1, Oct. 1996, pp. 224–227.

Tomokazu, Y., et al., "Software–Based Speech Recognition System", *Database Compendex 'Online Engineering Information'*, Abstract, vol. 44, No. 11, 1995, pp. 43–47.

* cited by examiner

Primary Examiner—Tālivaldis I. Šmits
Assistant Examiner—Daniel A. Nolan
(74) Attorney, Agent, or Firm—Bromberg & Sunstein LLP

(57) ABSTRACT

A speech controlled computer user interface communicates between a user and at least one application program. The user interface has a speech layer, an utterance layer, and a discourse layer. The speech layer is in communication with the user and converts between speech messages and text messages. The utterance layer is in communication with the speech layer, and converts between text messages and semantic meaning messages. The discourse layer is in communication with the utterance layer and the at least one application program, and processes messages from the user and the at least one application program, and generates responsive messages to the user and the at least one application program.

62 Claims, 11 Drawing Sheets

```
<S>:    !action("LIST MAIL")    <verb> <mail> <prop> <date>

<verb>:    "get" -
           "read" -
           "please list" -

<mail>:    "my mail" -
           "all mails" -

<prop>:    !action("SINCE")    "since" -
           !action("BEFORE")   "before" -

<date>:    !DateBegin <dates>  !DateEnd
           "today"
           "tomorrow"
           <weekday> "the"? <ordinal>?
```

FIG. 6

```
dialogue SelectMail()
local since, untill, sender, mail_IDs;
state ($mail_IDs == "")
    intention AskSelection( &since, &untill, &sender);

intention AskSelection( &firstdate, &lastdate, &sender);
action default speech (ASKSELECTION);
perception
    on (LIST MAIL FROM ?name)
        set sender $name;
    on (LIST MAIL ?prop ?date) {
        if ($prop == "SINCE" set firstdate $date;
        else set lastdate $date;
    }
```

FIG. 8

```
QLF      "(HowManyMails ?number ?type)"

TTSFIX   "*/#ju-hæv*/"

TTSVAR   number

TTSVAR   type

TTSFIX   "*/mJlz#/"

SMCFIX   general\smc\youhave.voc

SMCVAR   number

SMCVAR   type

SMCFIX   email\smc\mails.voc

TOKEN    "NEW"

TTSFIX   "*/nu*/"

SMCFIX   email\smc\new.voc
```

FIG. 10

SPEECH CONTROLLED COMPUTER USER INTERFACE

The present application claims priority from provisional patent application No. 60/103,059, filed Oct. 5, 1998, which is incorporated herein by reference.

TECHNICAL FIELD

The present invention relates to a speech controlled computer user interface for managing communications between a user and one or more computer applications.

BACKGROUND ART

Isolation is a concept that has recently emerged in computer user interface technology. In this context, isolation refers to separating human factors and ergonomical aspects of an application (i.e., the user interface) from the functionality of the application itself. The idea of user interface builders is another important concept in this field that refers to reversing the traditional software development cycle of developing core application functionality before the user interface. Instead, the user interface is developed first. This allows human factors related to man-machine interfacing to be addressed independently of the application functionality. Many development tools are currently available that provide for convenient design of Graphical User Interfaces (GUIs) and easy integration with application software. These tools have proved to be a major step forward for GUI-based application design.

GUIs are traditionally based on a metaphor of a desktop model having various different kinds of documents. GUI applications create, modify, move, and copy these documents through point and click actions. The graphical user interface of an application include devices such as commands organized in menus and dialog boxes that contain visual controls such as buttons, sliders, text, panels, meters, etc. The desktop model metaphor has worked well with GUIs, but is not intuitive for spoken conversations.

SUMMARY OF THE INVENTION

A preferred embodiment of the present invention provides a speech controlled computer user interface for communicating between a user and at least one application program. As used herein and in the accompanying claims, "communicating between" means communications from the user to the at least one application program, communications from the at least one application program to the user, and/or both ways. The user interface includes a speech layer in communication with the user that converts between speech messages and text messages; an utterance layer in communication with the speech layer that converts between text messages and semantic meaning messages; and a discourse layer in communication with the utterance layer and the at least one application program that processes messages from the user and the at least one application program and generates responsive messages to the user and the at least one application program.

In a further embodiment, the speech layer may include at least one of: a DTMF module that converts Dial Tone Multi-Frequency (DTMF) tones into representative text-based codes; an ASR module that converts speech signals into representative text using Automatic Speech Recognition (ASR) techniques; an SMC module that converts acoustic signals into digitally encoded speech signals using Speech/Music Compression (SMC) techniques; a concatenation module that converts text messages into electronic speech representative signals; and a TTS (Text-to-Speech) module that converts text messages into representative acoustic speech signals. The utterance layer may include a natural language understanding module that converts text messages from the speech layer into representative semantic meaning messages for the discourse layer and/or a message generator module that converts semantic meaning messages from the discourse layer into representative text messages for the speech layer.

In another embodiment, the discourse layer may include a dialogue manager based on a conversational agent model that analyzes internal beliefs, intentions, and desires that are associated with the user and the at least one application, updates the beliefs, and generates new intentions. In such a case, the discourse layer may also include an application perception module that converts application messages from the at least one application program into representative beliefs for the dialogue manager, an application action module that converts intentions from the dialogue manager into representative application messages for the at least one application program, a speech perception module that converts semantic meaning messages from the utterance layer into representative beliefs for the dialogue manager, and/or a speech action module that converts intentions from the dialogue manager into representative semantic meaning messages for the utterance layer.

The dialogue manager may use a perception process that receives information from the user and the at least one application program and generates beliefs representative of current states of the user and the at least one application program. A beliefs knowledge base in communication with the perception process may contain past and current beliefs for use by the dialogue manager. A planning process in communication with the beliefs knowledge base may determine how to change a current state to attain another possible state. A desires knowledge base may contain goals for the dialogue manager to determine a desirability of alternate possible states. A commitment process in communication with the beliefs knowledge base and the desires knowledge base may compare the desirability of selected possible states and determine a desired policy based on the current state and the desirability of the selected possible states. An intentions knowledge base in communication with the commitment process may maintain intentions representative of the desired policy. An acting process in communications with the intentions knowledge base may convert the intentions into information for the user and the at least one application program to accomplish the desired policy.

A further embodiment may also include a resource manager in communication with the discourse layer that manages use of system resources by the user interface. And, a set of development tools may allow an application developer to integrate the user interface with an application program.

A preferred embodiment includes a method of communicating via a speech controlled computer user interface between a user and at least one application program. The method includes converting between speech messages and text messages with a speech layer in communication with the user; converting between text messages and semantic meaning messages with an utterance layer in communication with the speech layer; and processing messages from the user and the at least one application program with a discourse layer in communication with the utterance layer and the at least one application program, and generating responsive messages to the user and the at least one application program.

In a further embodiment, converting between speech messages and text messages may include at least one of: converting Dial Tone Multi-Frequency (DTMF) tones into representative text-based codes with a DTMF module; converting speech signals into representative text using Automatic Speech Recognition (ASR) techniques with an ASR module; converting acoustic signals into digitally encoded speech signals using Speech/Music Compression (SMC) techniques with an SMC module; converting text messages into electronic speech representative signals with a concatenation module; and converting text messages into representative acoustic speech signals with a Text-to-Speech (TTS) module. Converting between text messages and semantic meaning messages may include converting, with a natural language understanding module, text messages from the speech layer into representative semantic meaning messages for the discourse layer and/or converting, with a message generator module, semantic meaning messages from the discourse layer into representative text messages for the speech layer.

In addition, or alternatively, processing messages may include analyzing, with a dialogue manager based on a conversational agent model, internal beliefs, intentions, and desires that are associated with the user and the at least one application, updating the beliefs, and generating new intentions. Analyzing with a dialogue manager may include converting, with an application perception module, application messages from the at least one application program into representative beliefs for the dialogue manager; converting, with an application action module, intentions from the dialogue manager into representative application messages for the at least one application program; converting, with a speech perception module, semantic meaning messages from the utterance layer into representative beliefs for the dialogue manager; and/or converting, with a speech action module, intentions from the dialogue manager into representative semantic meaning messages for the utterance layer.

Analyzing with a dialogue manager may also include receiving, with a perception process, information from the user and the at least one application program and generating beliefs representative of current states of the user and the at least one application program; containing, in a beliefs knowledge base in communication with the perception process, past and current beliefs for use by the dialogue manager; determining, with a planning process in communication with the beliefs knowledge base, how to change a current state to attain another possible state; containing, in a desires knowledge base, goals for the dialogue manager to determine a desirability of alternate possible states; comparing, with a commitment process in communication with the beliefs knowledge base and the desires knowledge base, the desirability of selected possible states, and determining a desired policy based on the current state and the desirability of the selected possible states; maintaining, in an intentions knowledge base in communication with the commitment process, intentions representative of the desired policy; and/or converting, with an acting process in communications with the intentions knowledge base, the intentions into information for the user and the at least one application program to accomplish the desired policy.

Another embodiment may include managing, with a resource manager in communication with the discourse layer, use of system resources by the user interface, and/or allowing, with a set of development tools, an application developer to integrate the user interface with an application program.

A preferred embodiment includes a speech controlled computer user interface for communicating between a user and at least one application program. The interface includes: a perception process that receives information from the user and the at least one application program and generates beliefs representative of current states of the user and the at least one application program; a beliefs knowledge base in communication with the perception process that contains past and current beliefs; a planning process in communication with the beliefs knowledge base that determines how to change the current states; a desires knowledge base that contains goals to determine a desirability of alternate possible states; a commitment process in communication with the beliefs knowledge base and the desires knowledge base that compares desirability of selected possible states and determines a desired policy based on the current state and the desirability of the selected possible states; an intentions knowledge base in communication with the commitment process that maintains intentions representative of the desired policy; and an acting process in communications with the intentions knowledge base that converts the intentions into information for the user and the at least one application program to accomplish the desired policy.

In a further embodiment, the information received by the perception process from the user may be provided by at least one of a speech music compression (SMC) process, an automatic speech recognition process (ASR), and a Dial Tone Multi-Frequency (DTMF) process. Or, the information received by the perception process from the user may be in semantic meaning form from a natural language understanding process. The information received by the perception process from the at least one application program may include at least one of keystrokes from a keyboard and selections from an application-associated menu. The beliefs knowledge base may use data frames to model a conversation. The acting process may include using artificial speech and/or an acting queue that sequences the information provided by the acting process. The intentions knowledge base may be further in communication with an expectations process that defines a grammar to use for a speech-related process which may include automatic speech recognition and/or natural language understanding.

A preferred embodiment includes a method of communicating via a speech controlled computer user interface between a user and at least one application program. The method includes: receiving information from the user and the at least one application program with a perception process, and generating beliefs representative of current states of the user and the at least one application program; containing past and current beliefs in a beliefs knowledge base in communication with the perception process; determining how to change the current states with a planning process in communication with the beliefs knowledge base; containing goals to determine a desirability of alternate possible states in a desires knowledge base; comparing desirability of selected possible states with a commitment process in communication with the beliefs knowledge base and the desires knowledge base, and determining a desired policy based on the current state and the desirability of the selected possible states; maintaining intentions representative of the desired policy in an intentions knowledge base in communication with the commitment process; and converting, with an acting process in communications with the intentions knowledge base, the intentions into information for the user and the at least one application program to accomplish the desired policy.

In a further embodiment, the information received from the user may be provided by at least one of a speech music compression (SMC) process, an automatic speech recognition process (ASR), and a Dial Tone Multi-Frequency (DTMF) process. The information received from the user may be in semantic meaning form from a natural language understanding process. The information received by the perception process from the at least one application program may include at least one of keystrokes from a keyboard and selections from an application-associated menu. Containing past and current beliefs may include using data frames to model a conversation. Converting with an acting process may include using artificial speech and/or sequencing the information provided by the acting process with an acting queue. Maintaining intentions may include defining, with an expectations process, a grammar to use for a speech-related process which may include an automatic speech recognition process or a natural language understanding process.

A preferred embodiment includes a method for a user to use a spoken message to control at least one application program. The method includes converting the spoken message to a semantic meaning message; and processing the semantic meaning message to generate a set of commands to control the at least one application program. In a further embodiment, the at least one application program is other than a word processing program. Converting the spoken message to a semantic meaning message may further include converting the spoken message to a text message, then converting the text message to a semantic meaning message. Converting between speech messages and text messages may also include at least one of: converting Dial Tone Multi-Frequency (DTMF) tones into representative text-based codes with a DTMF module; converting speech signals into representative text using Automatic Speech Recognition (ASR) techniques with an ASR module; converting acoustic signals into digitally encoded speech signals using Speech/Music Compression (SMC) techniques with an SMC module; converting text messages into electronic speech representative signals with a concatenation module; and converting text messages into representative acoustic speech signals with a Text-to-Speech (TTS) module.

The converting between text messages and semantic meaning messages may include converting, with a natural language understanding module, text messages into representative semantic meaning messages. Converting between text messages and semantic meaning messages may include converting, with a message generator module, semantic meaning messages into representative text messages. Processing messages may include analyzing, with a dialogue manager based on a conversational agent model, internal beliefs, intentions, and desires that are associated with the user and the at least one application, updating the beliefs, and generating new intentions. One embodiment further includes managing, with a resource manager, use of system resources by the user interface. Another embodiment includes allowing, with a set of development tools, an application developer to integrate the user interface with an application program.

BRIEF DESCRIPTION OF THE DRAWINGS

The present invention will be more readily understood by reference to the following detailed description taken with the accompanying drawings, in which:

FIG. 6 represents a sample of typical BNF grammar rules for a process according to FIG. 5.

FIG. 8 represents an example of a dialogue description script as used in the conversational agent of a preferred embodiment.

FIG. 10 represents an example of a message generation script as used in a preferred embodiment.

DETAILED DESCRIPTION OF SPECIFIC EMBODIMENTS

Figure 1:
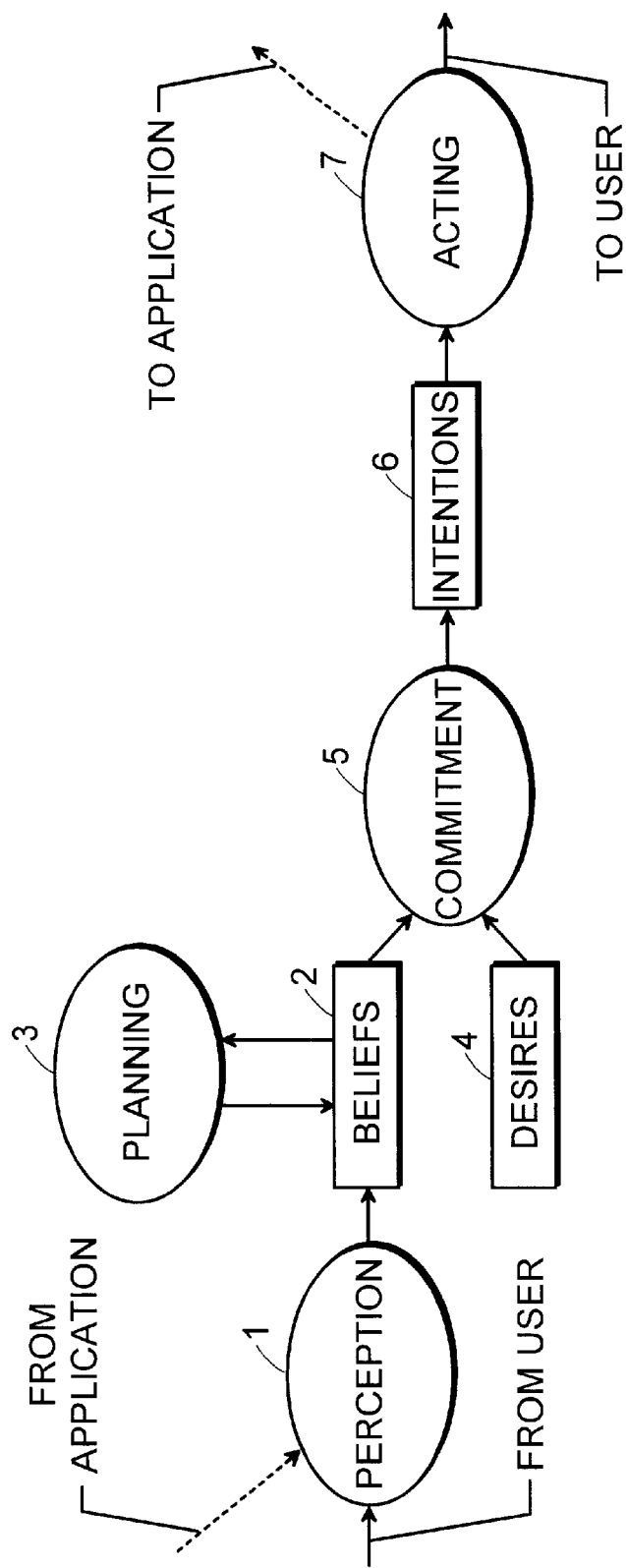
FIG. 1 illustrates the general architecture of a conversational agent such as used in a preferred embodiment of the present invention.

The concepts of computer user interface technology—i.e., isolation of the user interface and application, and user interface builders—may be employed in the creation a man-machine interface based on speech. Thus, a preferred embodiment of the present invention is generally directed to a speech user interface (SUI) that is isolated from application functionality and for which specialized development tools can be conceived.

Previously, application developers desiring to integrate speech capabilities into their applications have had to acquire a significant body of knowledge related to the various necessary speech technologies. At best, a separate application programming interface (API) might be used for each specific speech capability such as automatic speech recognition (ASR), text-to-speech (TTS), and speech/music compression (SMC). Current ASR engines have become powerful enough to incorporate general applications-related tasking such as command and control, data entry, and data retrieval. Thus, in theory, these three basic APIs are sufficient to allow a developer to create a speech-enabled application.

In practice, these basic speech-related APIs are still quite low-level, and they present application developers with many difficulties. A developer creating an application that uses a speech interface based on the previously existing speech-related APIs must overcome at least the following typical problems:

extracting meaning from continuous utterances,
relating actions to such meaning,
controlling basic dialog behavior,
generating speech messages related to the actions, and
managing the various software and hardware resources.

All the above problems require extensive knowledge of speech technology and natural language understanding. It is not reasonable to expect many application developers to acquire such knowledge in order to enable applications with a speech interface. Moreover, the various specific speech technologies each require additional setup and data to operate—all of which imposes a substantial and complex burden on the application developer.

A preferred embodiment of the present invention includes a general speech user interface (SUI) employing spoken dialog technology that combines and coordinates the traditional speech technologies—ASR, TTS, and SMC—along with the technologies of spoken language understanding, spoken language generation and dialog management. The SUI of a preferred embodiment encapsulates the human factors aspects of man-machine conversations such as scenarios (also known as conversation models); grammars for speech generation, recognition and understanding; and lexicons (vocabulary words, their pronunciation, etc.). The SUI relates to ASR, TTS and SMC in much the same way that a graphical user interface (GUI) relates to screen, keyboard and mouse drivers. The SUI also provides development tools that enable easy design of the user interface and easy integration of the interface with an application. Thus, an application developer need only work with the SUI in order to add speech as an application interface.

To add a graphical dialog box to an application, a developer would prefer to avoid the detailed steps of configuring screen layout, drawing windows and buttons, and setting up message loops to check for coordinates from the mouse or keystrokes from the keyboard, which then have to be mapped to the controls in the dialog box. The developer would greatly prefer to just draw controls and assign actions to each of these, leaving to the GUI itself such details as when a control is activated (mouse click, keyboard equivalent, . . . ) and how to give feedback to the user (graying controls, drawing pushed-down buttons, etc.). Similarly, the SUI of a preferred embodiment provides the developer with tools to add speech controls to an application, and to assign actions to these controls. For example, in one embodiment, giving feedback to the user makes use of pre-selected computer-spoken messages. Similarly, "drawing" speech controls, in a preferred embodiment, involves recording speech for playback and specifying control options which may include a grammar for the language that the control should accept.

Thus, the SUI of a preferred embodiment makes adding speech capabilities to an application easier in two important ways: 1) by providing processes for necessary tasks such as converting ASR output into meaning, reacting on meaning, and generating speech output from meaning; and 2) by presenting a single API to the developer and handling most component interrelations. For example, the addition of an entry to an information database with the SUI, may be sufficient to also update the ASR lexicon with a phonetic transcription and add a meaning value that refers to the database entry.

The SUI of a preferred embodiment thus represents a revolutionary new way to add speech capabilities to applications and to setup conversation systems over the phone. The SUI utilizes the capabilities provided by recent advances in technology including large vocabulary continuous speech recognition, improved text-to-speech capabilities, and dialogue technology. Thus, compared with prior art speech application interfaces, the SUI is more user-friendly and has greater functionality and flexibility.

In its simplest form, a preferred embodiment of the SUI need only support limited performance capabilities sufficient for tasks such as command and control with restricted speech. However, more advanced embodiments accommodate the needs for complex spoken dialogue systems with spontaneous speech and high user initiative. Thus, the SUI is well-suited for dialogues with medium to high complexity such as with quasi-spontaneous input. Typical applications include command & control, data retrieval for information systems, and data entry such as for reservation systems.

In a preferred embodiment, the SUI offers an easy to use high-level API in which the application and the speech user interface are separated. The SUI supports multi-modal applications, barge-in, and asynchronous message-based communication are supported, resulting in robust applications. Also included are development and testing tools for easy design and debugging of dialogues. A language independent description language is employed for conversation management which is modular and easily reusable. This supports user initiative and rephrasing prompts, as does use of time-outs for robust dialogues.

Analysis of the SUI must clearly distinguish between a run-time environment and a development environment for spoken dialogues. The runtime environment includes a collection of processes and documentation of their APIs organized as described herein. The run-time environment can be ported and integrated for a variety of platforms in different fields of use. The development environment, on the other hand, is a set of development tools that allow application developers to design, prototype, test and optimize the SUI for their applications. The development environment incorporates an integrated suite of tools that manipulate the various application-dependent data files needed by the runtime elements.

Rather than the desktop model of GUIs, spoken communication may best be viewed as involving multiple conversational agents in which the purpose of the communication is for one agent to affect the cognitive states of others. Spoken dialogue, as a special case, involves two communicating agents which use speech as a "conversation protocol". Thus, speech acts generated by one agent are perceived by the other agent, and vice versa. In a man-machine interface, one agent is human, the other one is artificial.

In the SUI of a preferred embodiment, there are one or more artificial conversational agents that communicate between the user(s) and the application(s). The artificial conversational agents use an machine protocol to communicate with applications and speech to communicate with users. In this model, the application can be seen as another agent that is not limited to communicative actions. An interfacing conversational agent can participate fully in dialogue and is limited to communicative actions. Such an interfacing agent exists in the rather limited world of language and thought and can only perceive utterances said to it or passed to it from the user or the application. The interfacing agent's only external actions are generating utterances to the user and generating messages to the application.

FIG. 1 illustrates the architecture of a conversational agent used in a SUI according to a preferred embodiment. A perception process 1 receives information communicated from the user and the application program. A beliefs knowledge base 2 is in communication with the perception process 1 and represents the current states of the user, the application program, and the interface itself. A planning process 3 is in communication with the beliefs knowledge base 2 and determines by a reasoning algorithm how to change the current state so as to attain other possible states. A desires knowledge base 4 determines a qualitative evaluation of possible states by having positive or negative responses to possible states, thereby creating a comparison of the desirability of various states. A commitment process 5 determines a desired action policy based on the information in the beliefs knowledge base 2 and in the desires knowledge base 4. An intentions knowledge base 6 is in communication with the commitment process 5 and maintains the desired action policy. An acting process 7 provides information to the user and the application program in order to accomplish the desired policy. Specifically, the acting process 7 performs speech acts such as uttering phrases for the user which ask, request, inform, deny, confirm, etc. Similarly, actions by the acting process 7 towards the application include inform, query, and answer.

Of the conversational agent elements outlined above, four—perception, planning, commitment and actions—are processes, and three—beliefs, desires and intentions—are knowledge bases comprising the agent's cognitive state. The conversational agent is continually updating its beliefs on perceptions, using its beliefs to reason about possible plans, committing to certain intentions based on beliefs and desires, and realizing these intentions by acting.

Figure 2:
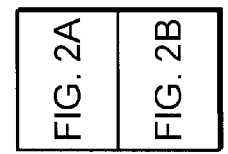
FIG. 2 illustrates a block diagram of a Speech User Interface (SUI) according to a preferred embodiment.
Figure 2A:
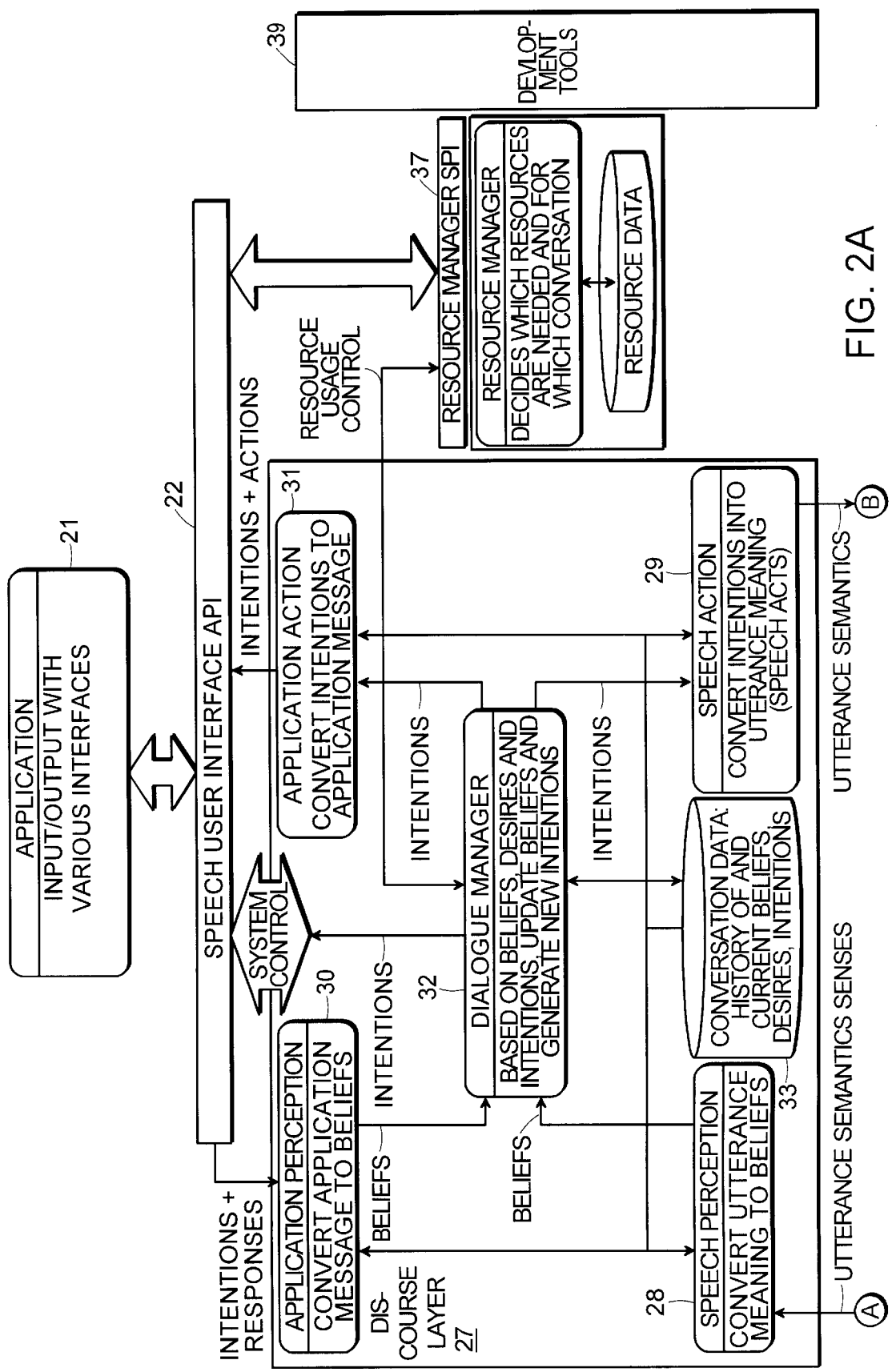
Figure 2B:
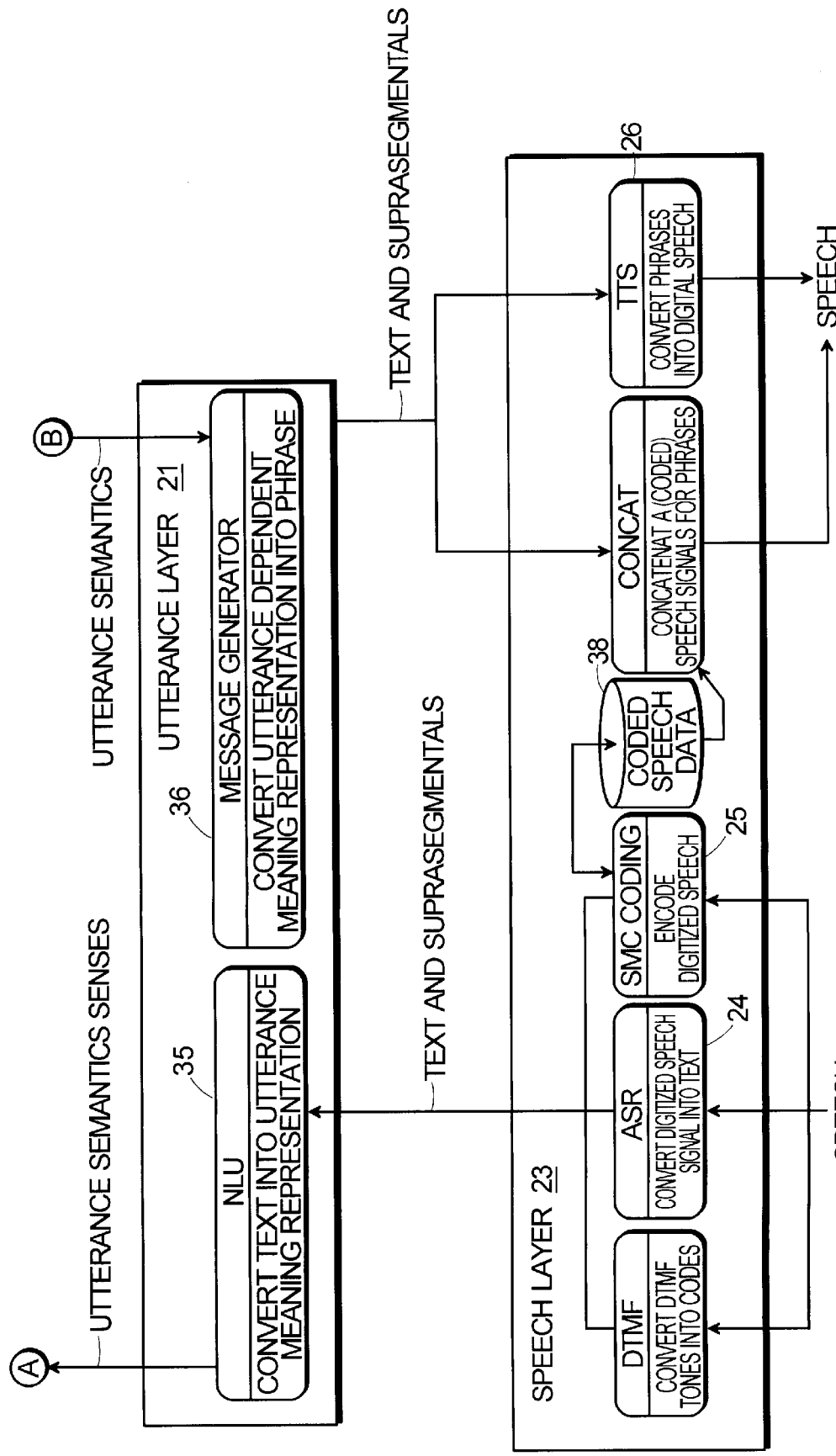

FIG. 2 presents a more detailed overview of a preferred embodiment of the SUI. The run-time environment of the SUI is shown towards the center of FIG. 2. The right side of FIG. 2 has a collection of tools which interact with the SUI in the design environment and which access many of the databases with application-specific data that the SUI components use at run time.

The top of FIG. 2 shows an application 21 interfaced with the SUI. The application 21 communicates to the SUI via the SUI API 22. To the application 21, the SUI is just another input/output means. Besides the SUI, the application 21 may also communicate with the user in various non-speech ways such as by a graphical user interface that allows keyboard and mouse input and that shows results on a display screen. The application 21 also may have communication with other processes such as data transfer over a network or even with peripherals such as sensors.

The application 21 communicates with the SUI through a SUI API 22 that shields the application 21 from the internals of the SUI. Thus, the SUI API 22 provides all the necessary functionality so that the application 21 can use speech as an interface, without handling many speech-specific details. The application 21 does not deal with speech in terms of acoustic signals or even as text, but communicates with the SUI in terms of "meaning", i.e., a description of knowledge using some formalism. In a preferred embodiment, the SUI API 22 may also provide some additional functionality that is not directly speech-related, e.g., provisions to enable smart resource allocation.

In a preferred embodiment, the SUI API 22 contains a platform-independent core with platform-specific layers over the core. The SUI API 22 maximally hides specific details of underlying technology and only interacts in meaning representation with application independent formalism. Use of dependent formalism would occasionally eliminate a conversion and imposes no limitations on messages, however, dependent formalism would also permit excessive application specific knowledge within the discourse layer 27 of the SUI (e.g., the fact that a specific query is SQL-format). In addition, application dependent formalism would require the unduly difficult operation of the application returning messages sent to it (i.e., intentions) because the answers must be coupled to the intentions.

The SUI API 22 of a preferred embodiment has at least four general functionalities: 1) creating, initializing, and removing instances; 2) properly structuring information from the SUI API 22 for the application 21; 3) resource management—e.g., assigning audio channels, etc.; and 4) selecting query capability options.

The SUI API 22 also has numerous dialogue specific tasks. Generally, dialogues may be added, removed, enabled or disabled. Any particular dialogue may be assigned focus. Various controls associated with the SUI API 22 can be active at the same time (e.g., general functions, window specific functions, operating system functions, etc.). In a preferred embodiment, each dialogue conducted through the SUI API 22 is modal so that only one set of commands remains active until that dialogue is finished.

The SUI API 22 also performs other dialogue specific functions in an embodiment. For example, data to and from the conversation database 33 may be queried, modified, added, or copied. It may be desirable, for instance, to be able to copy history or profile data for a specific user, and to use this data later again if the same user uses the dialogue. Semantic data—which may originate from external sources such as buttons, sensors, etc.—may also be sent to the dialogue manager 32. In addition, or alternatively, an embodiment may use the SUI API 22 to modify, add, or remove items in the various databases, with, for example, lexical entries and semantic codes (eg.,open word classes, user dictionaries, etc.). The SUI API 22 may also be used to turn on and off data and session logging for purposes of bootstrapping, maintenance and invoicing.

In one embodiment, the SUI API 22 is used to directly control some system options and even to place hooking filter functions in various modules within the SUI. This use can be a practical way to experiment with the various internal modules and to provide extended capabilities through hooks for some situations.

In the run-time environment, the SUI needs various internal components to extract meaning from incoming speech, to take appropriate actions and to generate speech for answers and new prompts. In FIG. 2, the SUI internal components are organized in three horizontal layers and two vertical parts. In the left vertical part, the signal flow is from bottom to top, whereas it is from top to bottom towards the right side of the figure.

In the speech layer 23 at the bottom of FIG. 2, the components deal with the acoustic nature of speech using modules for the basic speech technologies: ASR 24, SMC 25 and TTS 26. These either convert the acoustic signal to another representation (text, codes), or generate an acoustic signal from text or codes.

The topmost horizontal layer, the discourse layer 27 contains two processes that convert between utterance meaning and discourse meaning—speech perception module 28 that converts utterance meaning into discourse beliefs, and speech action module 29 that converts discourse intentions into utterance meaning. Utterance meaning is occasionally known in the art as context independent meaning, whereas discourse meaning is context dependent. Since the term "context" may be ambiguous in this setting (although, it is not ambiguous in the setting of ASR), the terms utterance meaning and discourse meaning are deemed more satisfactory.

Similarly, two processes convert between application messages and discourse meaning—application perception module 30 that converts application messages into discourse beliefs, and application action module 31 that converts discourse intentions into application messages. It is noted that in an embodiment, converting intentions to application messages could also be viewed as a function of the application itself.

A dialogue manager 32 is in communication with and controls the other modules of the discourse layer 27 and determines answers or prompts that have to be generated based on the current state of the dialogue. The application 21 only communicates with three components in the discourse layer: the dialogue manager 32, the application perception module 30, and the application action module 31. The application 21 initiates the dialogue manager 32 and can access conversation data 33 through the dialogue manager 32. The application 21 also sends information to the application perception module 30 and receives queries and information from the application action module 31.

In the utterance layer 34 in the middle of FIG. 2, the components convert between the intermediate formats—text and suprasegmentals—used by the processes in the speech layer 23, and an utterance meaning used by the discourse layer 27. Specifically, the natural language understanding (NLU) module 35 converts text from the speech layer 23 into an utterance meaning representation for the discourse layer 27. The message generator 36 converts utterance dependent meaning into formal language—text and suprasegmentals.

The discourse layer 27 is language independent. The utterance layer 34 and the speech layer 23 layers are language dependent. Similarly, the component processes of the utterance layer 34 and the speech layer 23 may also be language dependent. For a majority of components, this dependency is not in the software but in the data files that these processes use. In any case, the data that is exchanged between processes will be language dependent, except in the discourse layer 27.

Next to the horizontal layers, there is a section of processes that are not acting upon the main data flow but are rather helping the SUI in performing its tasks. An example of such process is the technology resource manager 37 that helps assigning resources to processes. The resource manager 37 needs to be instantiated only once and may serve multiple applications and multiple instances in a system. The resource manager 27 has its own platform independent API, however, its specific implementation is platform and configuration dependent.

In a preferred embodiment, the various processes within the SUI may use internal APIs to access the other processes including proprietary or standard APIs such as MS SAPI. Communicating with the various internal processes through standard APIs is preferred so that replacing components or updating versions is simplified. Moreover, use of standard existing APIs within the SUI is appropriate because the SUI architecture has to incorporate existing system architectures for ASR, TTS and SMC, and has to define extensions for spoken language understanding, spoken language generation and conversation modeling.

Such internal APIs may be hierarchically organized. For example, rather than dealing with the specific APIs of the ASR module 24 and the NLU module 35, the dialog manager 32 may act through a speech understanding API that hides irrelevant ASR- and NLU-specific functionality. Similarly, a speech generation API may be used by the message generator 36, independently of the underlying technology that is used in the speech layer 23: concatenation of coded speech, PAC speech or full text to speech.

The various processes in a preferred embodiment do not all need to be instantiated per interface channel. Only the processes in the discourse layer 27 need to maintain data during an entire conversation. The other processes are not even active during large parts of the conversation. In the specific case of half-duplex communication, either the input processes are active, e.g., ASR 24 or SMC 25, or the output process, e.g., TTS 26—meaning that resources associated with the inactive processes can be freed for other use. In the embodiment illustrated in FIG. 2, processes in the discourse layer 27 must be allocated per conversation, but processes in the other layers can be allocated at need, yielding economies in the amount of memory and CPU power required.

Most of the runtime processes of the SUI use static data at runtime. This data defines the behavior of the processes, and as such the behavior of the whole SUI. In order to develop an application with the SUI these data files have to be filled with application specific data. The SuI data files—conversation data 33 in the discourse layer 27 and coded speech data 38 in the speech layer 23—correlate to GUI resource and code files that define the shape of windows and dialog boxes, the placement of buttons, the texts displayed, and the behavior of the controls.

The SUI data files contain application specific information that can be edited with development tools. In a preferred embodiment, data representation within the data files is platform independent so that the data files are independent of the platform they are used on, and so that various processes can run on multiple platforms. In general, C code need not be written in order for an application to use the SUI, with the exception of additions to enable communication with the SUI API 22. Although the data files thus contain no C code, they may still be highly complex since some such files contain, for example, descriptions of application- or language-specific grammar. An integrated set of development tools makes it maximally easy for an application developer to create and modify the necessary data files.

Within the SUI of a preferred embodiment, all the internal processes support multiple instances or multiple threads and maintain no instance data that is necessary over a conversation (except for the processes in the utterance layer 34). Rather, the internal processes share static data as much as possible between instances and threads to minimize memory consumption.

In one embodiment, some of the internal processes may run on separate machines. Therefore, the run-time environment is designed to be able to run on a distributed computing environment with specialized CPU resources for speech recognition, text to speech, audio recording and play-back (coded or not), spoken language understanding, spoken language generation and conversational models. In such an embodiment, all the system components run concurrently to allow for the fastest response times of the overall system.

Towards the right side of FIG. 2, is a block of developments tools 39 for use in the SUI development environment. The development tools 39 include, for example, a grammar checker that enables off-line checking of grammars on test sentences. A dialogue compiler compiles textual descriptions of the dialogues into efficient C++ code. A dialogue tracer visualizes the state of a dialogue, allows dialogue debugging, provides debugging facilities, and provides development facilities.

A preferred embodiment is not limited to interfacing a single application, but may support multiple applications per channel. Accordingly, multiple applications may be active at the same time over the same audio channel. For example, in a personal computer environment there may be various applications that are using the same microphone input channel to listen for commands simultaneously. Similarly, it is also possible to disable some applications. For example, if a dialogue is ongoing, only the active application will get focus and the commands of other applications may be temporarily disabled.

Such an embodiment is designed to be able to handle multiple conversations concurrently, each of which might belong to different applications and have different dialogue models. Telephony server systems with many telephone lines designed to handle multiple calls simultaneously can run multiple applications at once, e.g., a server system handling 32 lines for a hotel reservation and another 32 lines for tourist information.

FIGS. 3–10 illustrate various aspects of the operation of a preferred embodiment of the SUI in a hypothetical system in which a user calls into an e-mail application by telephone and reviews any pending messages. In step 301 of FIG. 3, a user calls into an e-mail application which in communication with the SUI. In step 302, the e-mail application sends an application-specific message to the SUI telling it to initialize an instance of email-type dialogue, which the SUI does in step 303. In step 304 the SUI sends a notification message to the application that the dialogue has been initialized. It should be noted that this exchange between the application and the SUI is asynchronous, the application is always in control of the process.

The user may now speak over the phone with the application by way of the SUI in natural language exchanges. For example, as shown in step 305, at some point the user could ask the application: "Any incoming mail since Friday, the twenty-second?" The SUI processes the user input, extracts the meaning, and sends a message, step 306, instructing the application to list unread mail. The application then, in step 307, looks mail in its database, and sends a message back to the SUI that five new messages are waiting, step 308. In step 309, the SUI converts this application-generated message into a natural language speech message that is reported to the user over the telephone. When the user hangs up at the end of a session, step 310, the application sends a message to the SUI instructing it to close the open instance of the e-mail dialogue, step 311 at which time the SUI also performs any post-session cleanup operations, step 312.

Figure 3:
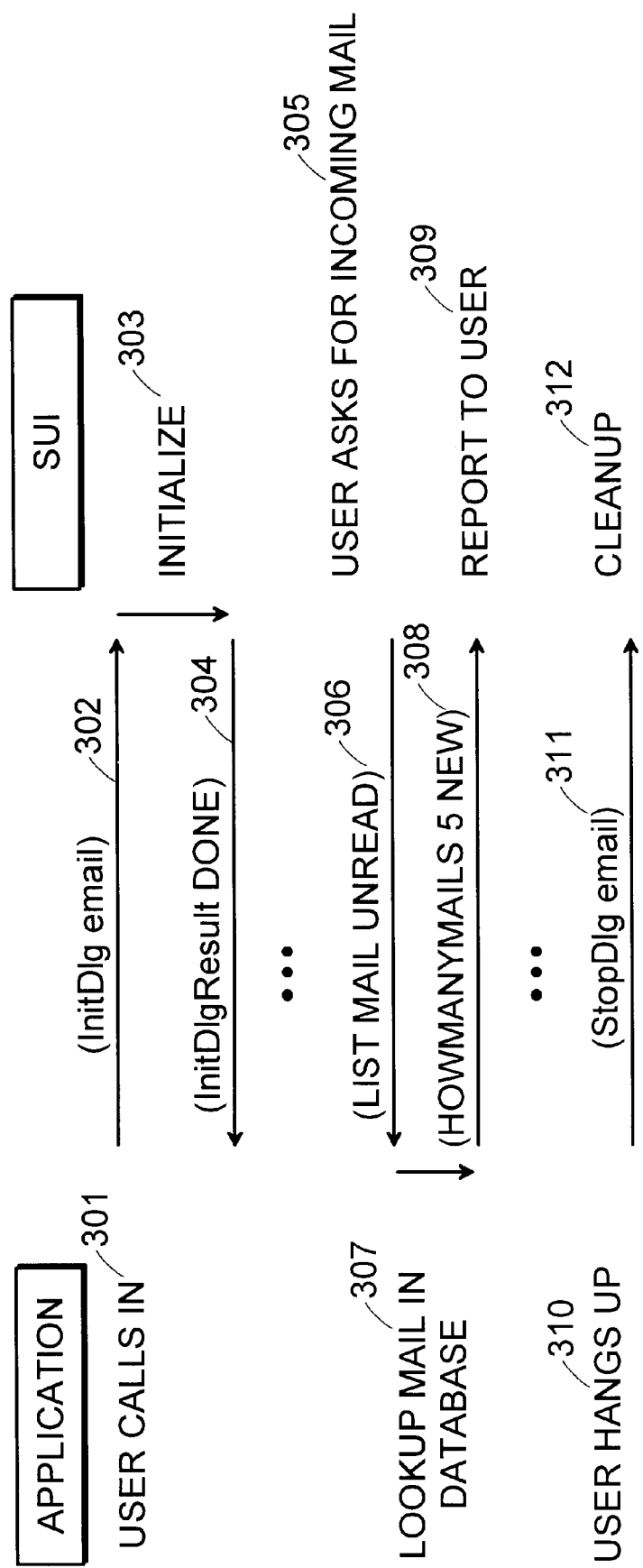
FIG. 3 illustrates a portion of a typical user session with a preferred embodiment.
Figure 4:
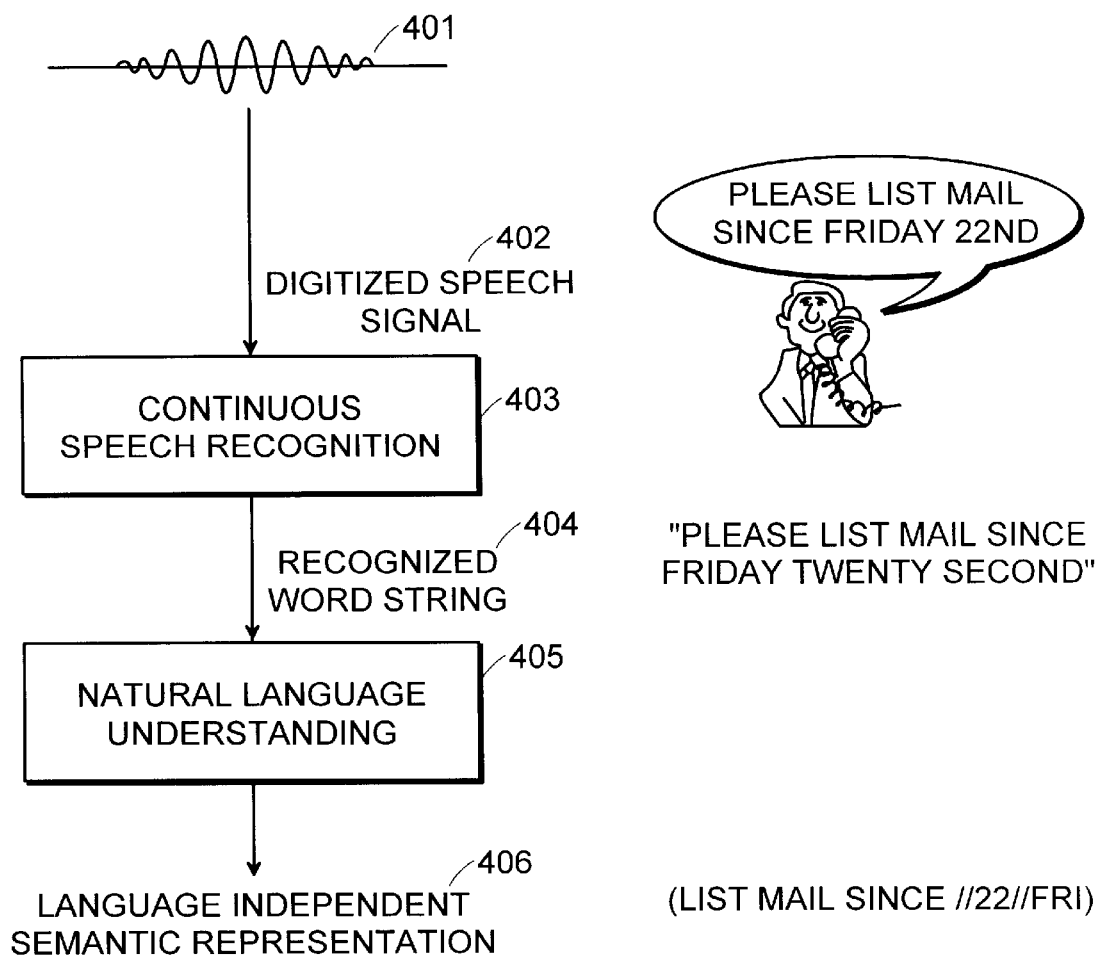
FIG. 4 illustrates the conceptual transformations occurring when the user provides an input message using the SUI.

FIG. 4 shows greater detail regarding the speech understanding process embodied in the speech to concept conversion such as in step 305 of FIG. 3, when the user asks the system for new e-mail. The user's voice input is initially an acoustic signal, 401, which is preprocessed into a digitized speech signal 402 (not shown) which is input for continuous speech recognition, step 403. With respect to the system depicted in FIG. 2, this occurs in the ASR module 24 of the speech layer 23. The recognized input speech is thereby converted into a representative text word string, step 404. This text sequence then must under go natural language understanding processing, step 405 in the NLU module 35 of the utterance layer 34. This process converts the representative text into a language independent semantic representation of the utterance meaning, step 406.

This part of the process requires speech understanding grammars such as are known in the art, which are typically based on Backus-Naur Format (BNF) formalism with action linking and segment fragment tagging. These tools—e.g., grammar checker, grammar compiler, lexicon tool, etc.—are intended to be designed by the application developer. Segment fragment interpreters are included in a preferred embodiment of the SUI toolkit for handling special case linguistic fragments such as numbers, both cardinals and ordinals, and date expressions (today, next Friday, August 8th, . . . ).

Figure 5:
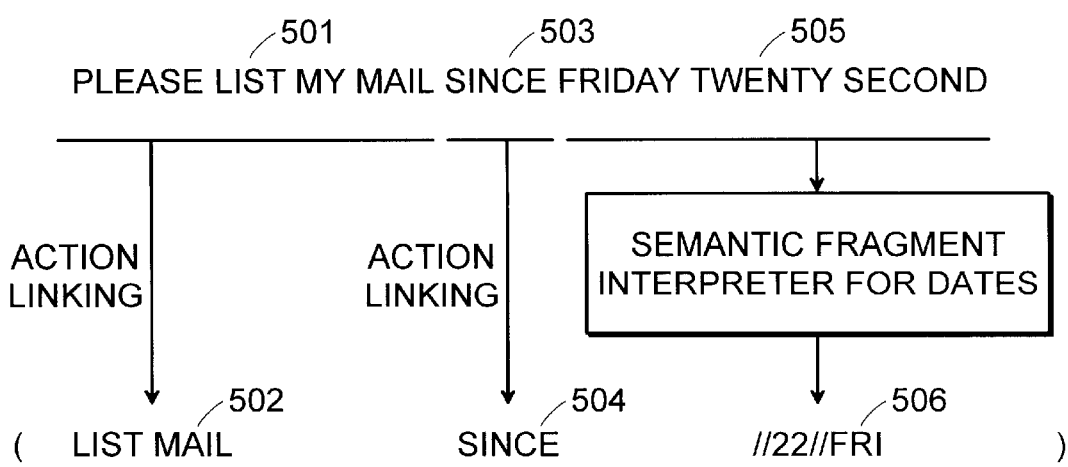
FIG. 5 depicts the conversion of representative text into a language independent semantic representation of utterance meaning.

FIG. 5 depicts the conversion of representative text into a language independent semantic representation of the utterance meaning by the natural language understanding step 405 of FIG. 4. In the representative text phrase: "please list my mail since Friday the twenty-second," the NLU module 35 performs an action linking mapping of the first part of the phrase, please list my mail 501 into the linguistic content meaning LIST MAIL 502. Similarly, middle of the phrase, since 503, is action linking mapped into the linguistic content meaning SINCE 504. The last part of the representative text phrase, Friday the twenty-second 505, is handled by a semantic fragment interpreter for dates into the proper content form //22//FRI 506. Example BNF grammar rules for such a process are illustrated in FIG. 6.

The semantic representation of the utterance meaning, step 406 in FIG. 4, is the output from the utterance layer 34 of the SUI that is input into the discourse layer 27 of FIG. 2. Within the discourse layer 27, the SUI performs conversation management utilizing conversational agents, depicted generally in FIG. 7. Application control of this process is limited to starting and stopping dialogues.

Figure 7:
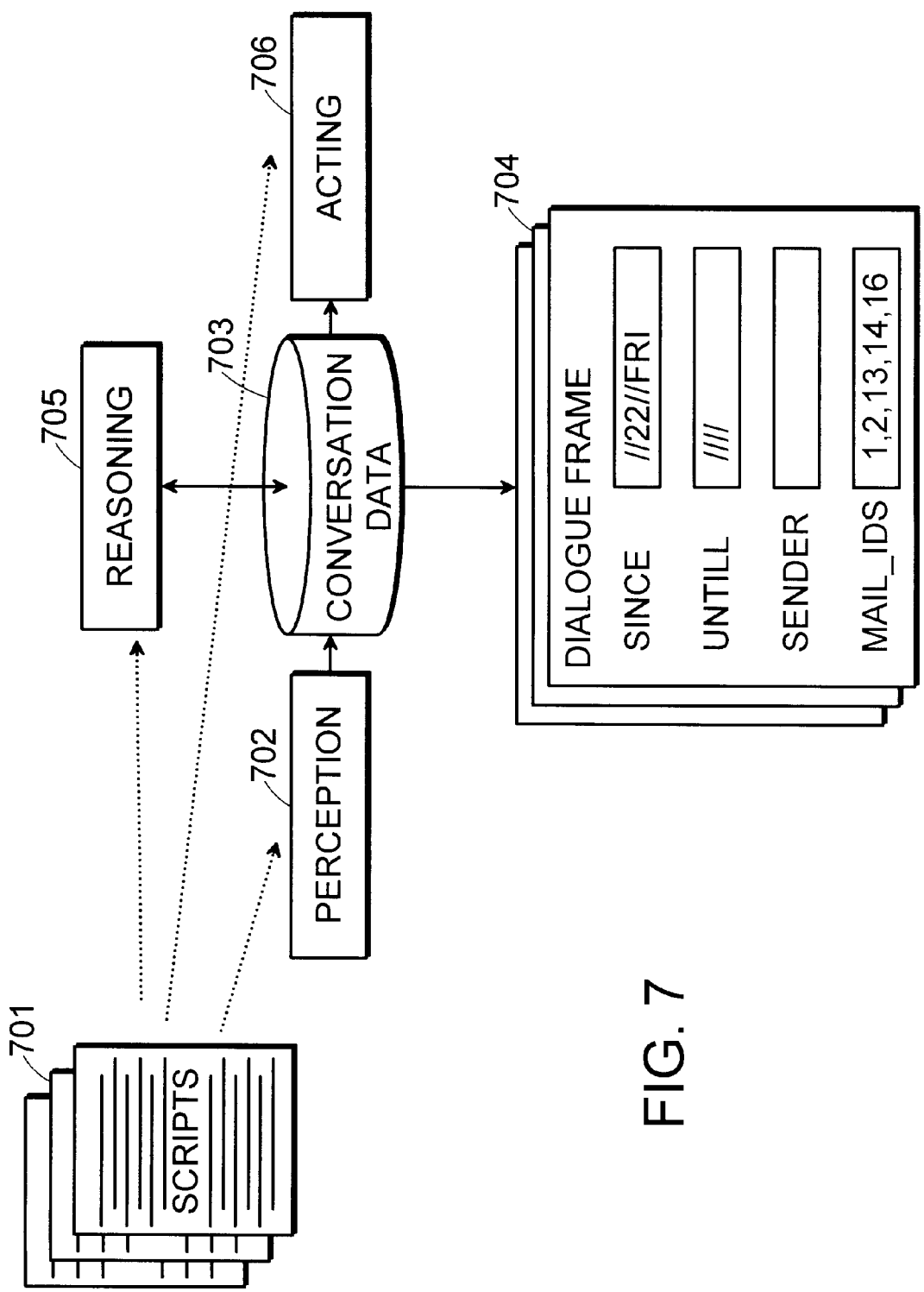
FIG. 7 illustrates functional blocks of a conversational agent as used in a preferred embodiment.

The language independent conversational agent of FIG. 7 is controlled by dialogue description scripts 701. An example of a script 701 for use in conversation management is depicted in FIG. 8. A script compiler converts dialogue and intention declarations into C++ files that set up the dialogues and intentions at start-up using statements that are C++ objects and a call expression evaluator. C++ expressions are copied to generated code which are referred to by index for evaluation as either a numeric or a string.

Based on the dialogue description scripts 701, meaning is interpreted in context according to the inputs received in the perception processes 702. These inputs into the perception processes 702 are quasi-logical form (QLF) from Speech Understanding, i.e., NLU module 35 in the utterance layer 34 of FIG. 2, and from the application in response to queries. From the perspective of the conversational agent, its awareness of the user includes senses without semantic meaning such as speech detection, speech output markers, too loud/silent, etc. Senses have pragmatic meaning, however, and can influence a given dialogue. Conversational agent awareness of the application also includes application events such as keyboard strokes and menu.

Conversation data 703 related to open instances of dialogue is maintained. Each user conversation is modeled as a sequence of several smaller dialogues. As depicted in FIG. 7, this conversation data 703 is kept in the form of data frames 704 for each dialogue which are managed in a frame stack from which one dialogue may call another. Each dialogue data frame 704 has various specified slots in which relevant data is maintained, with slot values being in the form of lists with an associated belief strength—unknown, ambiguous, unconfirmed, confirmed, etc. Slot references are converted to C++ inside expressions which generate strings if $ is prepended or a numeric value if # is prepended. Thus, the conversation data 703 reflects historical and current beliefs, desires, and intentions of the conversational agent.

The beliefs, desires, and intentions recorded in the conversation data 703 are used by a reasoning process 705 (i.e., the dialogue manager 32 in FIG. 2) in conjunction with the scripts 701, to draw conclusions, generate new intentions, and update the beliefs (e.g., identify missing information). Thus, intentions are formal representations of goals of the dialogue manager 32 and hold links to expectations for interpretation in context. The reasoning process 705, conversation data 703, and action process 706 also coordinately generate expectations which are derived from intentions and define grammars to use for ASR and NLU. The expectations are activated in parallel for all currently active intentions and indirectly define possible QLF events from speech.

This conversation management plan is both event driven and data driven. Being event driven supports features such as mixed-initiative, barge-in capability, time-outs, and asynchronous database access. From a data driven perspective, conversation data 703 uses data frames and slots with verification and confirmation. Systems data, e.g., for timing and statistics, includes use of rephrasing and user satisfaction control.

The intentions developed by the reasoning process 705 are sent to the action process 706 which develops QLF output for action in the application and utterance meaning speech output for message generation to the user. Within the action process 706 is an action queue which sequences the various speech and application actions. The action queue also maintains an historical record of executed actions to enable later rephrasings.

Further details of the conversation management plan depicted in FIG. 7 include the internal use of prompts which may be either modal or non-modal. With modal internal prompts, a dialogue cannot continue without input. With non-modal prompts, a dialogue can continue without input. In addition, internal timers may be either synchronous, in which case, the action queue is blocked for a specified time during operation, or the timers may be asynchronous, in which case, events time out after time has elapsed.

Figure 9:
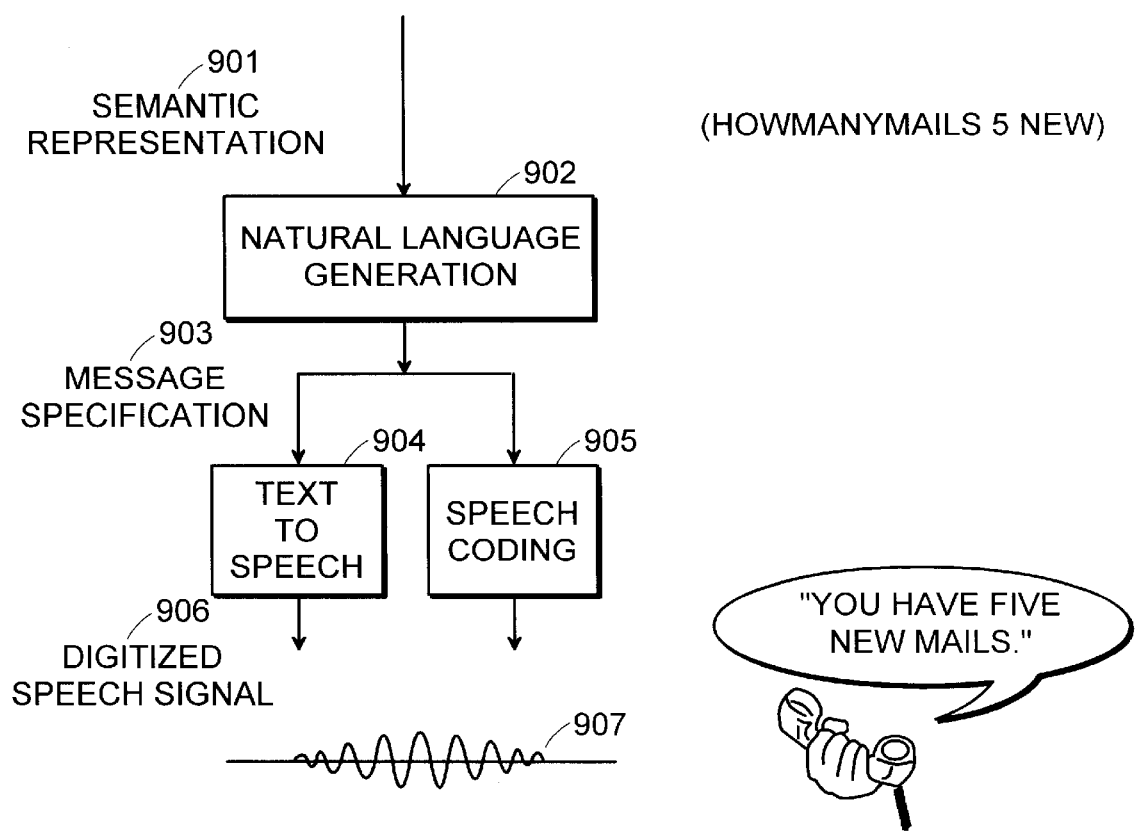
FIG. 9 illustrates the conceptual transformations occurring when the user receives and output message from the SUI.

When the conversational agent has information to communicate to the user, the action process 706 uses script language for message generation in a semantic form. Accordingly, TTS, SMC, and wave playback formats can be mixed together. Moreover, such an approach leads to easy localizing to other user languages. FIG. 9 shows the steps involved in communicating such a message to the user, and FIG. 10 shows an example of a message generation script.

A semantic representation of the message, step 901, is sent from the speech action process, 29 in FIG. 2, to the message generator 36 in the utterance layer 34. In natural language generation step 902, semantic representation 901 is converted into a message specification 903 of natural language text and suprasegmental phrases. This message specification 903 is converted into a digitized speech signal 906 by either text-to-speech 904 or speech coding 905. The digitized speech signal 906 is transformed (block not shown) into an analog speech signal 907 comprehensible to the user.

What is claimed is:

1. A speech controlled computer user interface for communicating between a user and at least one application program, the user interface comprising:
   a speech layer in communication with the user that converts between speech messages and text messages;
   an utterance layer in communication with the speech layer that converts between text messages and semantic meaning messages;
   a discourse layer in communication with the utterance layer and the at least one application program that processes messages from the user and the at least one application program and generates responsive messages to the user and the at least one application program; and
   a resource manager in communication with the discourse layer that manages use of system resources by the user interface.

2. A user interface according to claim 1, wherein the speech layer includes at least one of:
   a DTMF module that converts Dial Tone Multi-Frequency (DTMF) tones into representative text-based codes;
   an ASR module that converts speech signals into representative text using Automatic Speech Recognition (ASR) techniques;
   an SMC module that converts acoustic signals into digitally encoded speech signals using Speech/Music Compression (SMC) techniques;
   a concatenation module that converts text messages into electronic speech representative signals; and
   a TTS (Text-to-Speech) module that converts text messages into representative acoustic speech signals.

3. A user interface according to claim 1, wherein the utterance layer includes a natural language understanding module that converts text messages from the speech layer into representative semantic meaning messages for the discourse layer.

4. A user interface according to claim 1, wherein the utterance layer includes a message generator module that converts semantic meaning messages from the discourse layer into representative text messages for the speech layer.

5. A user interface according to claim 1, wherein the discourse layer includes a dialogue manager based on a conversational agent model that analyzes internal beliefs, intentions, and desires that are associated with the user and the at least one application, updates the beliefs, and generates new intentions.

6. A speech controlled computer user interface for communicating between a user and at least one application program, the user interface comprising:
   a speech layer in communication with the user that converts between speech messages and text messages;
   an utterance layer in communication with the speech layer that converts between text messages and semantic meaning messages; and
   a discourse layer in communication with the utterance layer and the at least one application program that processes messages from the user and the at least one application program and generates responsive messages to the user and the at least one application program, wherein the discourse layer includes:
   (i) a dialogue manager based on a conversational agent model that analyzes internal beliefs, intentions, and desires that are associated with the user and the at least one application, updates the beliefs, and generates new intentions, and
   (ii) an application perception module that converts application messages from the at least one application program into representative beliefs for the dialogue manager.

7. A speech controlled computer user interface for communicating between a user and at least one application program, the user interface comprising:
   a speech layer in communication with the user that converts between speech messages and text messages;
   an utterance layer in communication with the speech layer that conerts between text messages and semantic meaning messages; and
   a discourse layer in communication with the utterance layer and the at least one application program that processes messages from the user and the at least one application program and generates responsive messages to the user and the at least one application program, wherein the discourse layer includes:
   (i) a dialogue manager based on a conversational agent model that analyzes internal beliefs, intentions, and desires that are associated with the user and the at least one application, updates the beliefs, and generates new intentions, and
   ii) an application action module that converts intentions from the dialogue manager into representative application messages for the at least one application program.

8. A speech controlled computer user interface for communicating between a user and at least one application program, the user interface comprising:
   a speech layer in communication with the user that converts between speech messages and text messages;
   an utterance layer in communication with the speech layer that conerts between text messages and semantic meaning messages; and
   a discourse layer in communication with the utterance layer and the at least one application program that processes messages from the user and the at least one application program and generates responsive messages to the user and the at least one application program, wherein the discourse layer includes:
  (i) a dialogue manager based on a conversational agent model that analyzes internal beliefs, intentions, and desires that are associated with the user and the at least one application, updates the beliefs, and generates new intentions, and
  (ii) a speech perception module that converts semantic meaning messages from the utterance layer into representative beliefs for the dialogue manager.

9. A speech controlled computer user interface for communicating between a user and at least one application program, the user interface comprising:
  a speech layer in communication with the user that converts between speech messages and text messages;
  an utterance layer in communication with the speech layer that conerts between text messages and semantic meaning messages; and
  a discourse layer in communication with the utterance layer and the at least one application program that processes messages from the user and the at least one application program and generates responsive messages to the user and the at least one application program, wherein the discourse layer includes:
    (i) a dialogue manager based on a conversational agent model that analyzes internal beliefs, intentions, and desires that are associated with the user and the at least one application, updates the beliefs, and generates new intentions, and
    (ii) a speech action module that converts intentions from the dialogue manager into representative semantic meaning messages for the utterance layer.

10. A speech controlled computer user interface for communicating between a user and at least one application program, the user interface comprising:
  a speech layer in communication with the user that converts between speech messages and text messages;
  an utterance layer in communication with the speech layer that conerts between text messages and semantic meaning messages; and
  a discourse layer in communication with the utterance layer and the at least one application program that processes messages from the user and the at least one application program and generates responsive messages to the user and the at least one application program, wherein the discourse layer includes a dialogue manager based on a conversational agent model that analyzes internal beliefs, intentions, and desires that are associated with the user and the at least one application, updates the beliefs, and generates new intentions, wherein the dialogue manager uses a perception process that receives information from the user and the at least one application program and generates beliefs representative of current states of the user and the at least one application program.

11. A user interface according to claim 10, wherein the discourse layer includes a beliefs knowledge base in communication with the perception process that contains past and current beliefs for use by the dialogue manager.

12. A user interface according to claim 11, wherein the dialogue manager uses a planning process in communication with the beliefs knowledge base that determines how to change a current state to attain another possible state.

13. A user interface according to claim 12, wherein the discourse layer includes a desires knowledge base that contains goals for the dialogue manager to determine a desirability of alternate possible states.

14. A user interface according to claim 13, wherein the dialogue manager uses a commitment process in communication with the beliefs knowledge base and the desires knowledge base that compares the desirability of selected possible states and determines a desired policy based on the current state and the desirability of the selected possible states.

15. A user interface according to claim 14, wherein the discourse layer includes an intentions knowledge base in communication with the commitment process that maintains intentions representative of the desired policy.

16. A user interface according to claim 15, wherein the dialogue manager uses an acting process in communications with the intentions knowledge base that converts the intentions into information for the user and the at least one application program to accomplish the desired policy.

17. A user interface according to claim 1, further comprising:
  a set of development tools that allow an application developer to integrate the user interface with an application program.

18. A method of communicating via a speech controlled computer user interface between a user and at least one application program, the method comprising:
  converting between speech messages and text messages with a speech layer in communication with the user;
  converting between text messages and semantic meaning messages with an utterance layer in communication with the speech layer;
  processing messages from the user and the at least one application program with a discourse layer in communication with the utterance layer and the at least one application program, and generating responsive messages to the user and the at least one application program; and
  managing, with a resource manager in communication with the discourse layer, use of system resources by the user interface.

19. A method according to claim 18, wherein the converting between speech messages and text messages includes at least one of:
  converting Dial Tone Multi-Frequency (DTMF) tones into representative text-based codes with a DTMF module;
  converting speech signals into representative text using Automatic Speech Recognition (ASR) techniques with an ASR module;
  converting acoustic signals into digitally encoded speech signals using Speech/Music Compression (SMC) techniques with an SMC module;
  converting text messages into electronic speech representative signals with a concatenation module;
  converting text messages into representative acoustic speech signals with a Text-to-Speech (TTS) module; and
  managing, with a resource manager in communication with the discourse layer, use of system resources by the user interface.

20. A method according to claim 18, wherein converting between text messages and semantic meaning messages includes converting, with a natural language understanding module, text messages from the speech layer into representative semantic meaning messages for the discourse layer.

21. A method according to claim 18, wherein converting between text messages and semantic meaning messages includes converting, with a message generator module, semantic meaning messages from the discourse layer into representative text messages for the speech layer.

22. A method according to claim 18, wherein processing messages includes analyzing, with a dialogue manager based on a conversational agent model, internal beliefs, intentions, and desires that are associated with the user and the at least one application, updating the beliefs, and generating new intentions.

23. A method of communicating via a speech controlled computer user interface between a user and at least one application program, the method comprising:

converting between speech messages and text messages with a speech layer in communication with the user;

converting between text messages and semantic meaning messages with an utterance layer in communication with the speech layer;

processing messages from the user and the at least one application program with a discourse layer in communication with the utterance layer and the at least one application program, and generating responsive messages to the user and the at least one application program, the processing including analyzing, with a dialogue manager based on a conversational agent model, internal beliefs, intentions, and desires that are associated with the user and the at least one application, updating the beliefs, and generating new intentions;

wherein the analyzing with a dialogue manager includes converting, with an application perception module, application messages from the at least one application program into representative beliefs for the dialogue manager.

24. A method of communicating via a speech controlled computer user interface between a user and at least one application program, the method comprising:

converting between speech messages and text messages with a speech layer in communication with the user;

converting between text messages and semantic meaning messages with an utterance layer in communication with the speech layer;

processing messages from the user and the at least one application program with a discourse layer in communication with the utterance layer and the at least one application program, and generating responsive messages to the user and the at least one application program, the processing including analyzing, with a dialogue manager based on a conversational agent model, internal beliefs, intentions, and desires that are associated with the user and the at least one application, updating the beliefs, and generating new intentions;

wherein the analyzing with a dialogue manager includes converting, with an application action module, intentions from the dialogue manager into representative application messages for the at least one application program.

25. A method of communicating via a speech controlled computer user interface between a user and at least one application program, the method comprising:

converting between speech messages and text messages with a speech layer in communication with the user;

converting between text messages and semantic meaning messages with an utterance layer in communication with the speech layer;

processing messages from the user and the at least one application program with a discourse layer in communication with the utterance layer and the at least one application program, and generating responsive messages to the user and the at least one application program, the processing including analyzing, with a dialogue manager based on a conversational agent model, internal beliefs, intentions, and desires that are associated with the user and the at least one application, updating the beliefs, and generating new intentions;

wherein the analyzing with a dialogue manager includes converting, with a speech perception module, semantic meaning messages from the utterance layer into representative beliefs for the dialogue manager.

26. A method of communicating via a speech controlled computer user interface between a user and at least one application program, the method comprising:

converting between speech messages and text messages with a speech layer in communication with the user;

converting between text messages and semantic meaning messages with an utterance layer in communication with the speech layer;

processing messages from the user and the at least one application program with a discourse layer in communication with the utterance layer and the at least one application program, and generating responsive messages to the user and the at least one application program, the processing including analyzing, with a dialogue manager based on a conversational agent model, internal beliefs, intentions, and desires that are associated with the user and the at least one application, updating the beliefs, and generating new intentions;

wherein the analyzing with a dialogue manager includes converting, with a speech action module, intentions from the dialogue manager into representative semantic meaning messages for the utterance layer.

27. A method of communicating via a speech controlled computer user interface between a user and at least one application program, the method comprising:

converting between speech messages and text messages with a speech layer in communication with the user;

converting between text messages and semantic meaning messages with an utterance layer in communication with the speech layer;

processing messages from the user and the at least one application program with a discourse layer in communication with the utterance layer and the at least one application program, and generating responsive messages to the user and the at least one application program, the processing including analyzing, with a dialogue manager based on a conversational agent model, internal beliefs, intentions, and desires that are associated with the user and the at least one application, updating the beliefs, and generating new intentions;

wherein the analyzing with a dialogue manager includes receiving, with a perception process, information from the user and the at least one application program and generating beliefs representative of current states of the user and the at least one application program.

28. A method according to claim 27, wherein analyzing with a dialogue manager includes containing, in a beliefs knowledge base in communication with the perception process, past and current beliefs for use by the dialogue manager.

29. A method according to claim 28, wherein analyzing with a dialogue manager includes determining, with a planning process in communication with the beliefs knowledge base, how to change a current state to attain another possible state.

30. A method according to claim 29, wherein analyzing with a dialogue manager includes containing, in a desires knowledge base, goals for the dialogue manager to determine a desirability of alternate possible states.

31. A method according to claim 30, wherein analyzing with a dialogue manager includes comparing, with a commitment process in communication with the beliefs knowledge base and the desires knowledge base, the desirability of selected possible states, and determining a desired policy based on the current state and the desirability of the selected possible states.

32. A method according to claim 31, wherein analyzing with a dialogue manager includes maintaining, in an intentions knowledge base in communication with the commitment process, intentions representative of the desired policy.

33. A method according to claim 32, wherein analyzing with a dialogue manager includes converting, with an acting process in communications with the intentions knowledge base, the intentions into information for the user and the at least one application program to accomplish the desired policy.

34. A method according to claim 18, further comprising:
allowing, with a set of development tools, an application developer to integrate the user interface with an application program.

35. A speech controlled computer user interface for communicating between a user and at least one application program, the interface comprising:
a perception process that receives information from the user and the at least one application program and generates beliefs representative of current states of the user and the at least one application program;
a beliefs knowledge base in communication with the perception process that contains past and current beliefs;
a planning process in communication with the beliefs knowledge base that determines how to change the current states;
a desires knowledge base that contains goals to determine a desirability of alternate possible states;
a commitment process in communication with the beliefs knowledge base and the desires knowledge base that compares desirability of selected possible states and determines a desired policy based on the current state and the desirability of the selected possible states;
an intentions knowledge base in communication with the commitment process that maintains intentions representative of the desired policy; and
an acting process in communications with the intentions knowledge base that converts the intentions into information for the user and the at least one application program to accomplish the desired policy.

36. A user interface as in claim 35, wherein the information received by the perception process from the user is provided by at least one of a speech music compression (SMC) process, an automatic speech recognition process (ASR), and a Dial Tone Multi-Frequency (DTMF) process.

37. A user interface as in claim 35, wherein the information received by the perception process from the user is in semantic meaning form from a natural language understanding process.

38. A user interface as in claim 35, wherein the information received by the perception process from the at least one application program includes at least one of keystrokes from a keyboard and selections from an application-associated menu.

39. A user interface as in claim 35, wherein the beliefs knowledge base uses data frames to model a conversation.

40. A user interface as in claim 35, wherein the acting process includes using artificial speech.

41. A user interface as in claim 35, wherein the acting process includes an acting queue that sequences the information provided by the acting process.

42. A user interface as in claim 35, wherein the intentions knowledge base is further in communication with an expectations process that defines a grammar to use for a speech-related process.

43. A user interface as in claim 42, wherein the speech-related processes include automatic speech recognition.

44. A user interface as in claim 42, wherein the speech-related processes include natural language understanding.

45. A method of communicating via a speech controlled computer user interface between a user and at least one application program, the method comprising:
receiving information from the user and the at least one application program with a perception process, and generating beliefs representative of current states of the user and the at least one application program;
containing past and current beliefs in a beliefs knowledge base in communication with the perception process;
determining how to change the current states with a planning process in communication with the beliefs knowledge base;
containing goals to determine a desirability of alternate possible states in a desires knowledge base;
comparing desirability of selected possible states with a commitment process in communication with the beliefs knowledge base and the desires knowledge base, and determining a desired policy based on the current state and the desirability of the selected possible states;
maintaining intentions representative of the desired policy in an intentions knowledge base in communication with the commitment process; and
converting, with an acting process in communications with the intentions knowledge base, the intentions into information for the user and the at least one application program to accomplish the desired policy.

46. A method as in claim 45, wherein the information received from the user is provided by at least one of a speech music compression (SMC) process, an automatic speech recognition process (ASR), and a Dial Tone Multi-Frequency (DTMF) process.

47. A method as in claim 45, wherein the information received from the user is in semantic meaning form from a natural language understanding process.

48. A method as in claim 45, wherein the information received by the perception process from the at least one application program includes at least one of keystrokes from a keyboard and selections from an application-associated menu.

49. A method as in claim 45, wherein containing past and current beliefs includes using data frames to model a conversation.

50. A method as in claim 45, wherein converting with an acting process includes using artificial speech.

51. A method as in claim 45, wherein converting with an acting process includes sequencing the information provided by the acting process with an acting queue.

52. A method as in claim 45, wherein maintaining intentions includes defining, with an expectations process, a grammar to use for a speech-related process.

53. A method as in claim 52, wherein the speech-related process includes an automatic speech recognition process.

54. A method as in claim 52, wherein the speech-related process includes a natural language understanding process.

55. A method for a user to use a spoken message to control at least one application program, the method comprising:

converting the spoken message to a semantic meaning message;

processing the semantic meaning message to generate a set of commands to control the at least one application program; and managing, with a resource manager, use of system resources by the user interface.

56. A method according to claim 55, wherein the at least one application program is other than a word processing program.

57. A method according to claim 55, wherein converting the spoken message to a semantic meaning message further comprises converting the spoken message to a text message, then converting the text message to a semantic meaning message.

58. A method according to claim 57, wherein the converting between speech messages and text messages includes at least one of:

converting Dial Tone Multi-Frequency (DTMF) tones into representative text-based codes with a DTMF module;

converting speech signals into representative text using Automatic Speech Recognition (ASR) techniques with an ASR module;

converting acoustic signals into digitally encoded speech signals using Speech/Music Compression (SMC) techniques with an SMC module;

converting text messages into electronic speech representative signals with a concatenation module; and converting text messages into representative acoustic speech signals with a Text-to-Speech (TTS) module.

59. A method according to claim 57, wherein converting between text messages and semantic meaning messages includes converting, with a natural language understanding module, text messages into representative semantic meaning messages.

60. A method according to claim 57, wherein converting between text messages and semantic meaning messages includes converting, with a message generator module, semantic meaning messages into representative text messages.

61. A method according to claim 57, wherein processing messages includes analyzing, with a dialogue manager based on a conversational agent model, internal beliefs, intentions, and desires that are associated with the user and the at least one application, updating the beliefs, and generating new intentions.

62. A method according to claim 57, further comprising:

allowing, with a set of development tools, an application developer to integrate the user interface with an application program.

* * * * *